(12) United States Patent
Jeong et al.

(10) Patent No.: US 11,183,709 B2
(45) Date of Patent: Nov. 23, 2021

(54) POLYMER, ELECTROLYTE INCLUDING THE SAME, AND LITHIUM BATTERY INCLUDING THE POLYMER

(71) Applicant: SAMSUNG SDI CO., LTD., Yongin-si (KR)

(72) Inventors: Myunghwan Jeong, Yongin-si (KR); Kyoungsoo Kim, Yongin-si (KR); Yongchan You, Yongin-si (KR); Manseok Han, Yongin-si (KR); Taejeong Kim, Yongin-si (KR); Erang Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 345 days.

(21) Appl. No.: 16/315,034

(22) PCT Filed: Jul. 12, 2017

(86) PCT No.: PCT/KR2017/007461
§ 371 (c)(1),
(2) Date: Jan. 3, 2019

(87) PCT Pub. No.: WO2018/012877
PCT Pub. Date: Jan. 18, 2018

(65) Prior Publication Data
US 2019/0312305 A1    Oct. 10, 2019

(30) Foreign Application Priority Data

Jul. 13, 2016    (KR) .................. 10-2016-0088707

(51) Int. Cl.
*C08G 65/40*    (2006.01)
*C08G 65/48*    (2006.01)
*C08L 71/10*    (2006.01)
*H01M 10/04*    (2006.01)
*H01M 10/052*    (2010.01)
(Continued)

(52) U.S. Cl.
CPC ........ *H01M 10/0565* (2013.01); *C08G 65/40* (2013.01); *C08G 65/48* (2013.01); *C08J 3/24* (2013.01); *C08L 71/10* (2013.01); *H01M 8/1018* (2013.01); *H01M 10/0422* (2013.01);
(Continued)

(58) Field of Classification Search
None
See application file for complete search history.

(56) References Cited

U.S. PATENT DOCUMENTS 6,384,166 B1    5/2002    Austin et al.
7,695,860 B2    4/2010    Amine et al.
(Continued)

FOREIGN PATENT DOCUMENTS

CN    101024687 A    8/2007
CN    102190790 A    9/2011
(Continued)

OTHER PUBLICATIONS

JP2004-131662A—machine translation (Year: 2004).*
(Continued)

*Primary Examiner* — Haroon S. Sheikh
(74) *Attorney, Agent, or Firm* — Lee IP Law, PC

(57) ABSTRACT

Provided are a polymer represented by Formula 1, an electrolyte including the same, and a lithium battery including the polymer.

15 Claims, 1 Drawing Sheet

(51) Int. Cl.
    *H01M 10/0565*     (2010.01)
    *H01M 8/1018*     (2016.01)
    *C08J 3/24*     (2006.01)

(52) U.S. Cl.
    CPC ....... *H01M 10/052* (2013.01); *C08L 2203/20* (2013.01); *Y02E 60/50* (2013.01)

(56) References Cited

U.S. PATENT DOCUMENTS

| | | | |
|---|---|---|---|
| 9,634,355 B2 | 4/2017 | Kim et al. | |
| 2003/0044688 A1 | 3/2003 | Kang et al. | |
| 2007/0104993 A1* | 5/2007 | Lee | H01M 8/1023 |
| | | | 429/482 |
| 2007/0196721 A1* | 8/2007 | Lee | H01M 8/1032 |
| | | | 429/483 |
| 2008/0045615 A1* | 2/2008 | Best | H01M 8/1027 |
| | | | 521/27 |
| 2008/0146841 A1* | 6/2008 | Kaneko | C08F 214/18 |
| | | | 562/825 |
| 2008/0199757 A1* | 8/2008 | Kim | C08F 112/30 |
| | | | 429/494 |
| 2008/0290022 A1* | 11/2008 | Sanchez | B01J 47/12 |
| | | | 210/500.33 |
| 2010/0323275 A1* | 12/2010 | Machida | H01M 8/1027 |
| | | | 429/493 |
| 2011/0213103 A1* | 9/2011 | Lee | C08G 75/20 |
| | | | 525/471 |
| 2012/0045711 A1* | 2/2012 | Lee | H01M 8/1027 |
| | | | 429/494 |
| 2012/0129045 A1* | 5/2012 | Gin | H01M 10/0566 |
| | | | 429/189 |
| 2015/0218313 A1* | 8/2015 | Wang | C08J 5/2262 |
| | | | 429/307 |
| 2017/0170516 A1* | 6/2017 | Desmurs | C08L 71/00 |

FOREIGN PATENT DOCUMENTS

| | | |
|---|---|---|
| JP | H 04-323260 A | 11/1992 |
| JP | 2003-086250 A | 3/2003 |
| JP | 2003-208815 A | 7/2003 |
| JP | 2004131662 A * | 4/2004 |
| JP | 2015-074657 A | 4/2015 |
| KR | 10-2010-0095725 A | 9/2010 |
| KR | 10-2013-0124794 A | 11/2013 |
| KR | 10-2016-0024411 A | 3/2016 |
| WO | WO 1991-009070 A1 | 6/1991 |
| WO | WO 03-083973 A | 10/2003 |
| WO | WO 2003-083972 A1 | 10/2003 |

OTHER PUBLICATIONS

Chinese Office action dated Jun. 30, 2020.
Z. Xue, et al., "Poly(ethylene oxide)-based electrolytes for lithium-ion batteries", J. Mater. Chem. A, 2015.
International Search Report dated Dec. 12, 2017.
Chinese Office action dated Mar. 22, 2021.

* cited by examiner

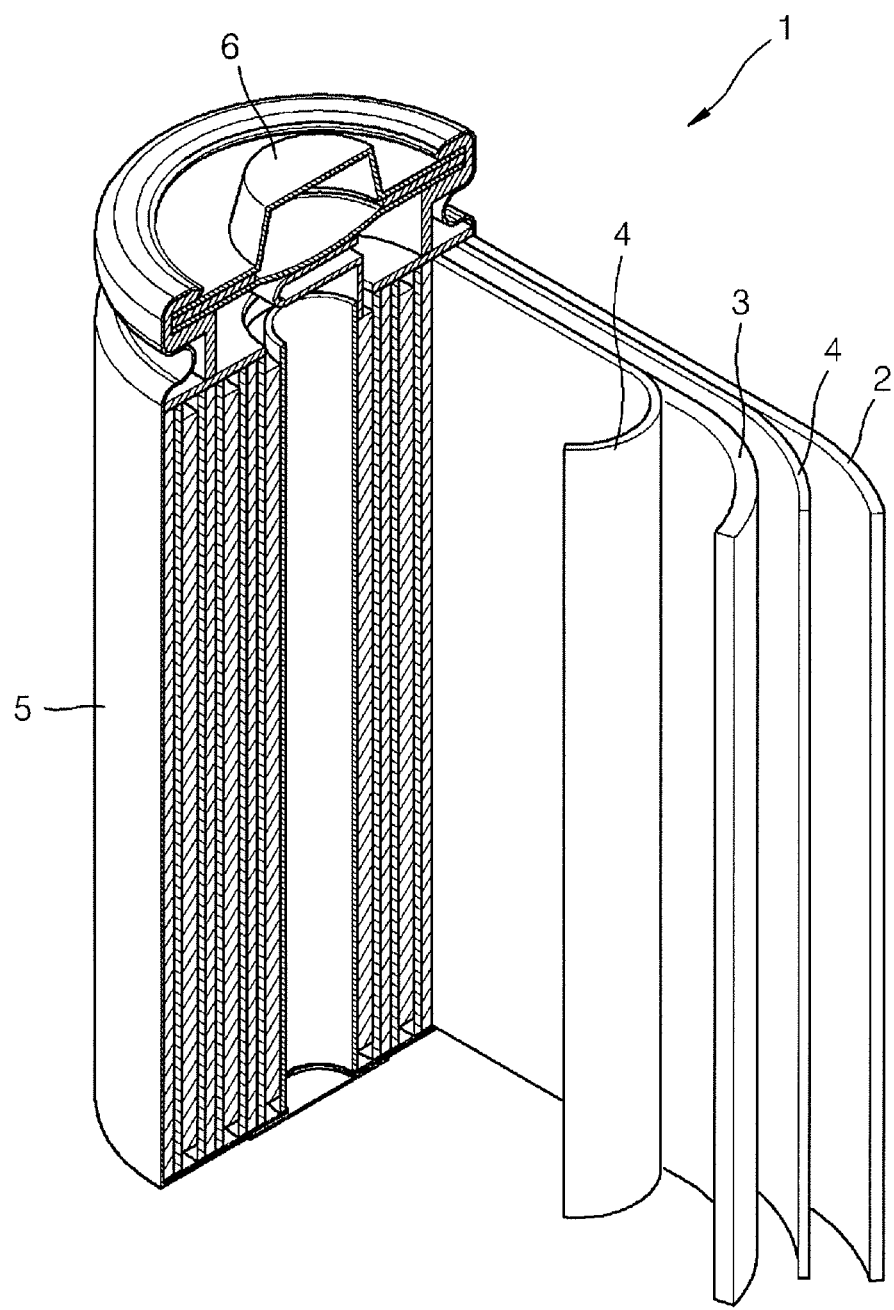

POLYMER, ELECTROLYTE INCLUDING THE SAME, AND LITHIUM BATTERY INCLUDING THE POLYMER

CROSS-REFERENCE TO THE RELATED APPLICATION

This is the U.S. national phase application based on PCT Application No. PCT/KR2017/007461, filed Jul. 12, 2017, which is based on Korean Patent Application No. 10-2016-0088707, filed Jul. 13, 2016, the entire contents of all of which are hereby incorporated by reference.

TECHNICAL FIELD

The present disclosure relates to a polymer, an electrolyte including the same, and a lithium battery including the polymer.

BACKGROUND ART

Lithium batteries are used as driving sources of portable electronic devices, such as camcorders, mobile phones, and laptop computer. Lithium secondary batteries are rechargeable at high rates and have a high energy density per weight of about three times higher than that of lead storage batteries, nickel-cadmium (Ni—Cd) batteries, and nickel-hydrogen batteries, and nickel-zinc batteries.

In a lithium battery, an organic electrolyte solution is generally used, and such an organic electrolyte solution is prepared by dissolving a lithium salt in an organic solvent. The organic electrolyte solution are at risk of explosion at high temperatures and are apt to be leaked, and thus, an electrolyte in gel or solid form is required.

A representative gel or solid electrolyte is a polymer electrolyte, and an example of the polymer electrolyte includes polyethylene oxide (PEG). However, such a polymer electrolyte including PEO has poor ionic conductivity, thermal properties, and mechanical properties.

Accordingly, there is a need for a polymer having improved ionic conductivity, thermal properties, and mechanical properties, and a polymer electrolyte including the polymer.

DESCRIPTION OF EMBODIMENTS

Technical Problem

Provided is a novel polymer.
Provided is an electrolyte including the novel polymer.
Provided is a lithium battery including the novel polymer.

Solution to Problem

According to an aspect of the present disclosure, there is provided a polymer represented by Formula 1:

<Formula 1>

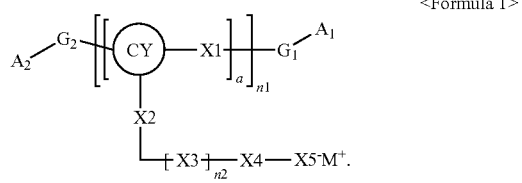

In Formula 1,
CY may be a 6-membered to 30-membered ring group having 2 to 30 carbon atoms, and selectively, one or more heteroatoms, the 6-membered to 30-membered ring group may include an unsubstituted or substituted $C_3$-$C_{30}$ cycloalkyl ring, an unsubstituted or substituted $C_3$-$C_{30}$ heterocycloalkyl ring, an unsubstituted or substituted $C_6$-$C_{30}$ aryl ring, or an unsubstituted or substituted $C_2$-$C_{30}$ heteroaryl ring, X1, X2, and X4 may each independently be a covalent bond; an unsubstituted or substituted $C_1$-$C_4$ alkylene group; or a heteroatom-containing linking group, X3 may be a repeat unit having a heteroatom,
$X5^-$ may be an anionic functional group,
$M^+$ may be a cation,
$G_1$ and $G_2$ may each independently be —O—, —S—, or -G-$C_6H_5$—, $A_1$ and $A_2$ may each independently a crosslinkable functional group,
a may be an integer from 2 to 5,
n1 may be an integer from 2 to 100, and
n2 may be an integer from 1 to 300.

According to another aspect of the present disclosure, there is provided an electrolyte including:
the polymer; and
a lithium salt.

According to another aspect of the present disclosure, there is provided a lithium battery including:
a cathode;
ja anode; and
the electrolyte located between the cathode and the anode,
wherein at least one selected from the cathode, the anode, and the electrolyte includes at least one of the polymer and a crosslinking product thereof.

Advantageous Effects of Disclosure

According to an aspect, use of a polymer having a novel structure may lead to improvement of ionic conductivity and thermal and mechanical properties of an electrolyte.

BRIEF DESCRIPTION OF DRAWING

FIG. 1 is a schematic diagram of a lithium battery according to an embodiment.

<Explanation of Reference numerals designating the Major Elements of the Drawing>

| | |
|---|---|
| 1. Lithium battery | 2. Anode |
| 3. Cathode | 4. Separator |
| 5. Battery case | 6. Cap assembly |

BEST MODE

Hereinafter, a polymer according to an embodiment, an electrolyte including the polymer, and a lithium battery including the polymer will be described in more detail.

As the inventive concepts disclosed herein allow for various changes and numerous embodiments, particular embodiments will be described in detail in the written description, and if necessary, will be illustrated in the drawings. Effects and features of the inventive concepts disclosed herein and the methods of achieving the effects and the features will be clarified with reference to the embodiments described in detail with the drawings. However, the inventive concepts disclosed herein should not be construed as limited to the embodiments set forth herein, and may be embodied in many different forms.

It will be understood that although the terms "first," "second," etc., may be used herein to describe various components, these components should not be limited by these terms. These components are used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

When a certain embodiment may be implemented differently, a specific process order may be performed differently from the described order. For example, two consecutively described processes may be performed substantially at the same time or performed in an order opposite to the described order.

Hereinafter, the embodiments will be described more fully with reference to the accompanying drawings, if necessary. In the following description with reference to the drawings, the same reference numerals are used for the same or corresponding elements, and the repeated descriptions will be omitted.

Sizes of components in the drawings may be exaggerated for convenience of explanation. In other words, since sizes and thicknesses of components in the drawings are arbitrarily illustrated for convenience of explanation, the inventive concepts disclosed herein are not limited thereto.

According to an embodiment, a polymer is represented by Formula 1:

<Formula 1>

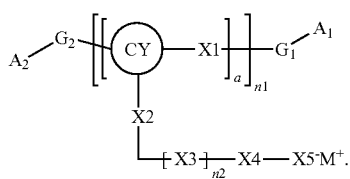

In Formula 1,

CY may be a 6-membered to 30-membered ring group having 2 to 30 carbon atoms, and selectively, one or more heteroatoms.

the 6-membered to 30-membered ring group may include an unsubstituted or substituted $C_3$-$C_{30}$ cycloalkyl ring, an unsubstituted or substituted $C_3$-$C_{30}$ heterocycloalkyl ring, an unsubstituted or substituted $C_6$-$C_{30}$ aryl ring, or an unsubstituted or substituted $C_2$-$C_{30}$ heteroaryl ring, X1, X2, and X4 may each independently be a covalent bond; an unsubstituted or substituted $C_1$-$C_4$ alkylene group; or a heteroatom-containing linking group, X3 may be a repeat unit having a heteroatom, X5$^-$ may be an anionic functional group, M$^+$ may be a cation, $G_1$ and $G_2$ may each independently be —O—, —S—, or —O—$C_6H_5$—, wherein —$C_6H_5$— is a phenylene group, $A_1$ and $A_2$ may each independently a crosslinkable functional group, a may be an integer from 2 to 5, n1 may be an integer from 1 to 100, and n2 may be an integer from 1 to 300.

The polymer may include two or more cyclic groups (CYs) so as to improve mechanical properties thereof, and due to a repeat unit (X3) including a heteroatom, flexibility of the polymer may be also improved. Therefore, the polymer simultaneously including the cyclic groups (CYs) and the repeat unit (X3) including a heteroatom may be able to adjust a length of the polymer, thereby providing improved ionic conductivity and thermal and mechanical properties. Here, the properties may be easily controlled. Accordingly, an electrolyte and a lithium battery that include the polymer may also have improved properties.

In the polymer, substituents of the $C_3$-$C_{10}$ cycloalkyl ring, the $C_3$-$C_{30}$ cycloalkyl ring, the $C_6$-$C_{30}$ aryl group, the $C_2$-$C_{30}$ heteroaryl ring, and the $C_1$-$C_4$ alkylene group may each independently be a polar functional group including hydrogen, halogen, a $C_1$-$C_{20}$ alkyl group unsubstituted or substituted with halogen, a $C_2$-$C_{20}$ alkenyl group unsubstituted or substituted with halogen, a $C_2$-$C_{20}$ alkynyl group unsubstituted or substituted with halogen, a $C_3$-$C_{20}$ cycloalkenyl group unsubstituted or substituted with halogen, a $C_3$-$C_{20}$ heterocyclyl group heterocyclyl group unsubstituted or substituted with halogen, a $C_6$-$C_{40}$ aryl group unsubstituted or substituted with halogen, a $C_2$-$C_{40}$ heteroaryl group unsubstituted or substituted with halogen, or one or more heteroatoms.

For example, the polar functional group including the one or more heteroatoms may include at least one selected from —F, —Cl, —Br, —I, —C(=O)OR$^{16}$, —OR$^{16}$, —OC(=O)OR$^{16}$, —R$^{15}$OC(=O)OR$^{16}$, —C(=O)R$^{16}$, —R$^{15}$C(=O)R$^{16}$, —OC(=O)R$^{16}$, —R$^{15}$OC(=O)R$^{16}$, —C(=O)—O—C(=O)R$^{16}$, —R$^{15}$C(=O)—O—C(=O)R$^{16}$, —SR$^{16}$, —R$^{15}$SR$^{16}$, —SSR$^{16}$, —R$^{15}$SSR$^{16}$, —S(=O)R$^{16}$, —R$^{15}$S(=O)R$^{16}$, —R$^{15}$C(=S)R$^{16}$, —R$^{15}$C(=S)SR$^{16}$, —R$^{15}$SO$_3$R$^{16}$, —SO$_3$R$^{16}$, —NNC(=S)R$^{16}$, —R$^{15}$NNC(=S)R$^{16}$, —R$^{15}$N=C=S, —NCO, —R$^{15}$—NCO, —NO$_2$, —R$^{15}$NO$_2$, —R$^{15}$SO$_2$R$^{16}$, —SO$_2$R$^{16}$,

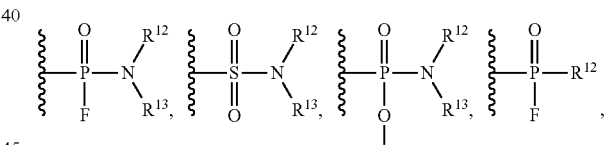

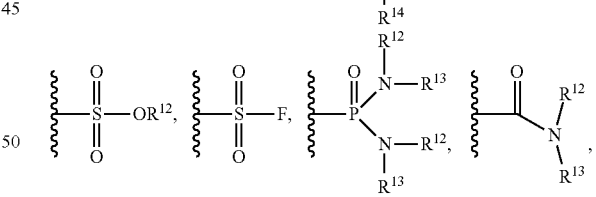

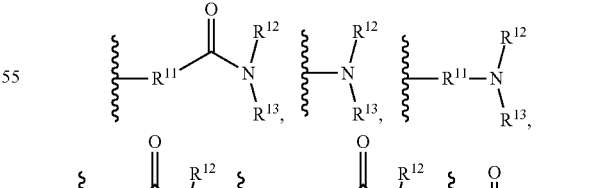

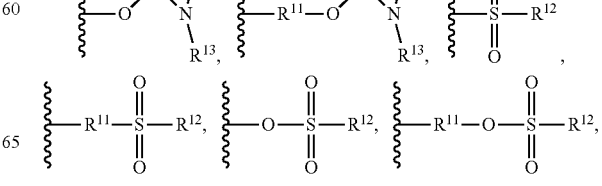

-continued

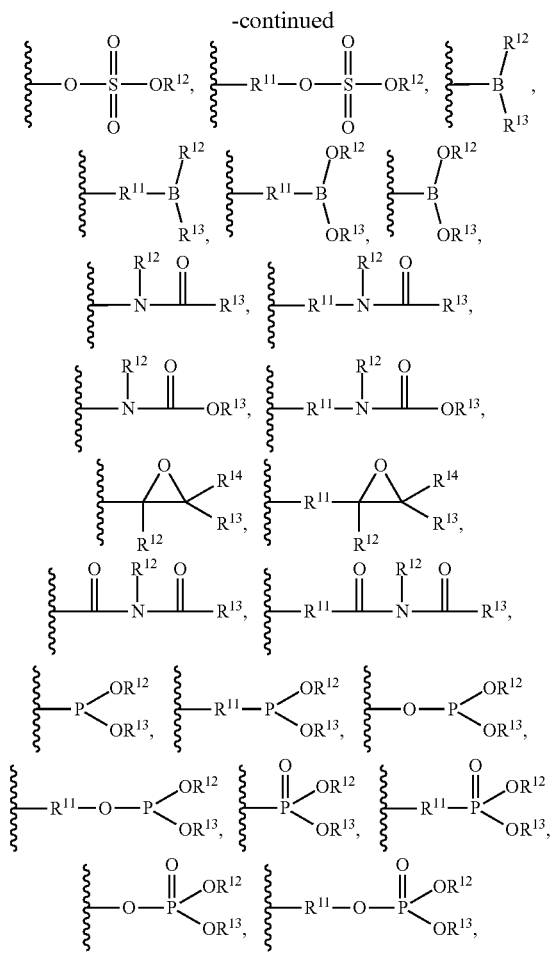

wherein $R^{11}$ and $R^{15}$ may each independently be a $C_1$-$C_{20}$ alkylene group unsubstituted or substituted with halogen; a $C_2$-$C_{20}$ alkenylene group unsubstituted or substituted with halogen; a $C_2$-$C_{20}$ alkynylene group unsubstituted or substituted with halogen; a $C_3$-$C_{12}$ cycloalkylene group unsubstituted or substituted with halogen; a $C_6$-$C_{40}$ arylene group unsubstituted or substituted with halogen; a $C_2$-$C_{40}$ heteroarylene group unsubstituted or substituted with halogen; a $C_7$-$C_{15}$ alkylarylene group unsubstituted or substituted with halogen; or a $C_7$-$C_{15}$ aralkylene group unsubstituted or substituted with halogen, and $R^{12}$, $R^{13}$, $R^{14}$, and $R^{16}$ may each independently be hydrogen; halogen; a $C_1$-$C_{20}$ alkyl group unsubstituted or substituted with halogen; a $C_2$-$C_{20}$ alkenyl group unsubstituted or substituted with halogen; a $C_2$-$C_{20}$ alkynyl group unsubstituted or substituted with halogen; a $C_3$-$C_{12}$ cycloalkyl group unsubstituted or substituted with halogen; a $C_6$-$C_{40}$ aryl group unsubstituted or substituted with halogen; a $C_2$-$C_{40}$ heteroaryl group unsubstituted or substituted with halogen; a $C_7$-$C_{15}$ alkylaryl group unsubstituted or substituted with halogen; a $C_7$-$C_{15}$ trialkylsilyl group unsubstituted or substituted with halogen; or a $C_7$-$C_{15}$ aralkyl group unsubstituted or substituted with halogen.

For example, the halogen substituted in the alkyl group, the alkenyl group, the alkynyl group, and cycloalkyl group, the aryl group, the heteroaryl group, the alkylaryl group, the trialkylsilyl group, or the aralkyl group, each included in the polar functional group including the one or more heteroatoms, may be fluorine (F).

For example, the polymer represented by Formula 1 may be represented by Formula 2:

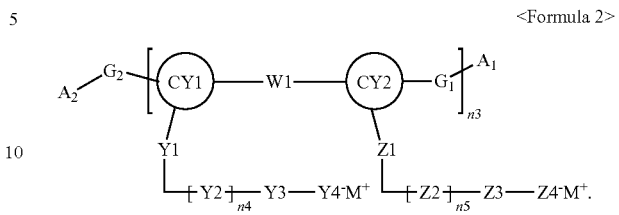

<Formula 2>

In Formula 2,

CY1 and CY2 may each independently be an unsubstituted or substituted C6-C30 cycloalkyl ring, an unsubstituted or substituted C3-C30 heterocycloalkyl ring, an unsubstituted or substituted C6-C30 aryl ring, or an unsubstituted or substituted C2-C30 heteroaryl ring, W1, Y1, Y3, Z1, and Z3 may each independently be a covalent bond; an unsubstituted or substituted $C_1$-$C_4$ alkylene group; or a heteroatom-containing linking group.

Y2 and Z2 may each independently be a repeat unit having a heteroatom, $Y5^-$ and $Z4^-$ may each independently be an anionic functional group, $M^+$ may be a cation, $G_1$ and $G_2$ may each independently be —O—, —S—, or —O—$C_6H_5$—, $A_1$ and $A_2$ may each independently be a crosslinkable functional group, n3 may be an integer from 1 to 100, and n4 and n5 may each independently be an integer from 1 to 300.

For example, the polymer represented by Formula 1 may be represented by Formula 3:

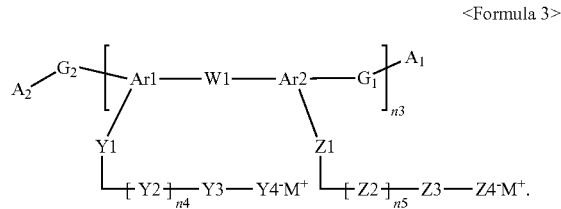

<Formula 3>

In Formulae 3, $Ar_1$ and $Ar_2$ may each independently include an unsubstituted or substituted $C_6$-$C_{30}$ aryl ring or an unsubstituted or substituted $C_2$-$C_{30}$ heteroaryl ring, W1, Y1, Y3, Z1, and Z3 may each independently be a covalent bond; an unsubstituted or substituted $C_1$-$C_4$ alkylene group; or a heteroatom-containing linking group, Y2 and Z2 may each independently be a repeat unit having a heteroatom, $Y5^-$ and $Z4^-$ may each independently be an anionic function group, $M^+$ may be a cation, $G_1$ and $G_2$ may each independently be —O—, —S—, or —O—$C_6H_5$—, $A_1$ and $A_2$ may each independently be a crosslinkable functional group, n3 may be an integer from 1 to 100, and n4 and n5 may each independently an integer from 1 to 300.

For example, the polymer represented by Formula 1 may be represented by Formula 4:

<Formula 4>

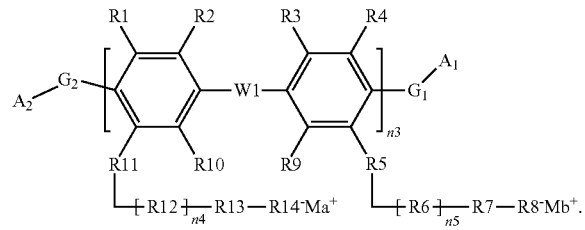

In Formula 4, R1, R2, R3, R4, R9, and R10 may each independently be hydrogen; halogen; a $C_1$-$C_5$ alkyl group unsubstituted or substituted with halogen; or a $C_6$-$C_{20}$ aryl group unsubstituted or substituted with halogen, W1, R5, R7, R11, and R13 may each independently be a covalent bond; an unsubstituted or substituted $C_1$-$C_4$ alkylene group; or a heteroatom-containing linking group.

R6 and R12 may each independently be —R15-O— or —C(═O)O—,

R15 may be a $C_2$-$C_{10}$ alkylene group unsubstituted or substituted with halogen, $Y5^-$ and $Z4^-$ may each independently be —$SO_3^-$, —$CO_2^-$, or —P(═O)(OH)$O^-$, $Ma^+$ and $Mb^+$ may each independently be a hydrogen ion or an alkali metal cation, $G_1$ and $G_2$ may each independently be —O—, —S—, or —O—$C_6H_5$—, $A_1$ and $A_2$ may each independently be a crosslinkable functional group, n3 may be an integer from 1 to 100, and n4 and n5 may each independently be an integer from 1 to 300.

For example, in the polymer, an unsubstituted or substituted $C_1$-$C_4$ alkylene group, may be unsubstituted or substituted methylene group. A substituent of the unsubstituted or substituted $C_1$-$C_4$ alkylene group may be a methyl group, an ethyl group, or the like. For example, an unsubstituted or substituted $C_1$-$C_4$ alkylene group may be specifically a dimethylmethylene group.

For example, in the polymer, the crosslinkable functional group may be a vinyl group unsubstituted or substituted with halogen, an allyl group unsubstituted or substituted with halogen, an ethynyl group unsubstituted or substituted with halogen, or an epoxy group unsubstituted or substituted with halogen, wherein the halogen may be, for example, fluorine (F).

For example, the heteroatom-containing linking group included in the polymer may be —O—, —S—, —S(═O)—, —S(═O)2-, —C(═O)—, —Si($E_1$)($E_2$)-, or —P(═O)($E_3$)-, wherein $E_1$, $E_2$, and $E_3$ may each independently be hydrogen, halogen, or a $C_1$-$C_{10}$ alkyl group unsubstituted or substituted with halogen; or a $C_6$-$C_{20}$ aryl group unsubstituted or substituted with halogen. For example, the polymer may be represented by one of Formulae 5 to 17:

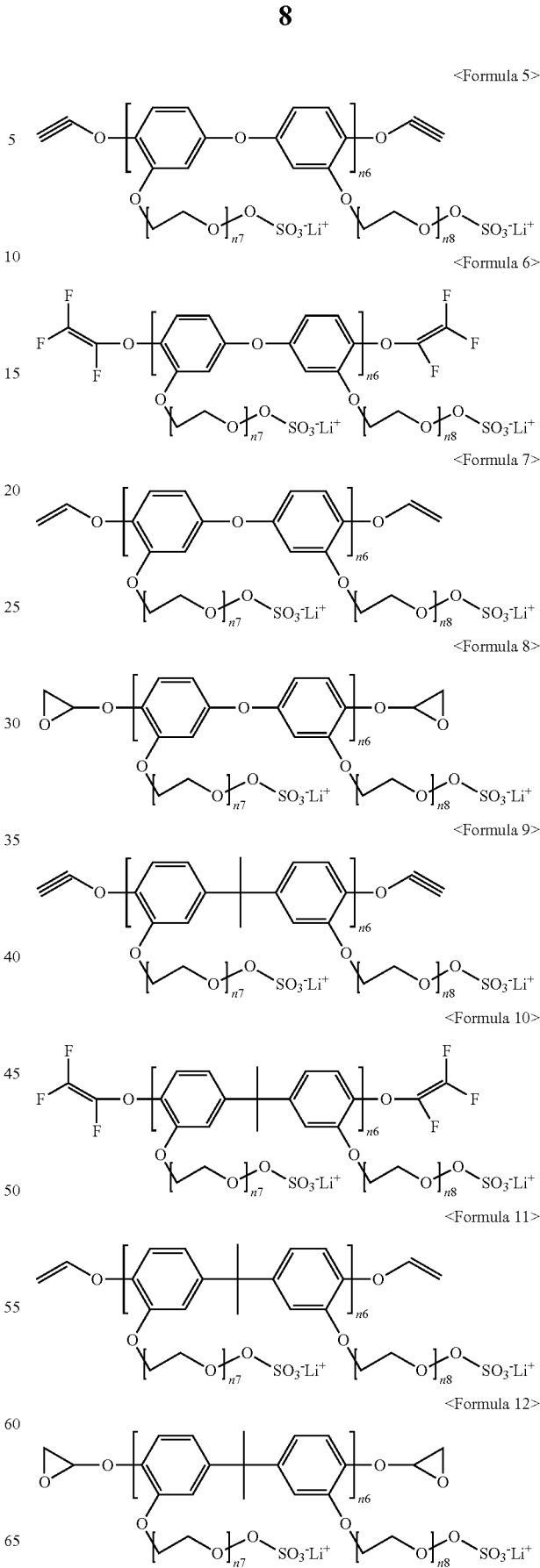

-continued

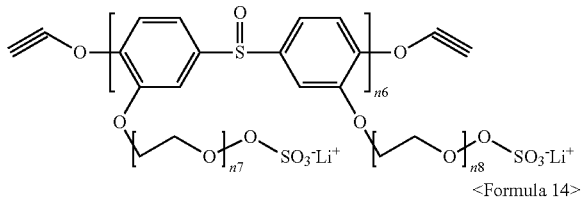

<Formula 13>

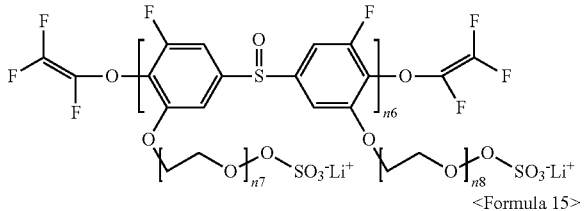

<Formula 14>

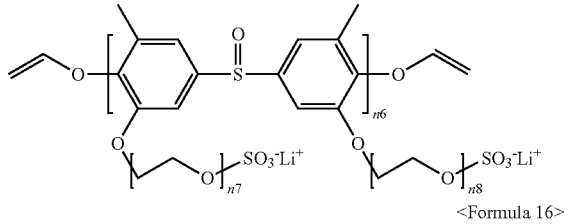

<Formula 15>

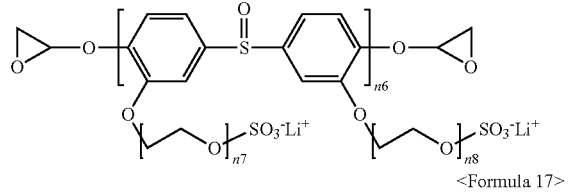

<Formula 16>

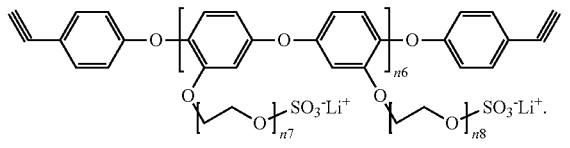

<Formula 17>

In the formulae above, n6 may be an integer from 2 to 100, and n7 and n8 may each independently be an integer from 2 to 300. For example, n6 may be an integer from 2 to 100, and n7 and n8 may each independently be an integer from 2 to 200. For example, n6 may be an integer from 2 to 100, and n7 and n8 may each independently be an integer from 2 to 100. For example, n6 may be an integer from 2 to 70, and n7 and n8 may each independently be an integer from 2 to 100. For example, n6 may be an integer from 5 to 50, and n7 and n8 may each independently be an integer from 10 to 100.

As used herein, 'a' and 'b' in the term "$C_a$-$C_b$" denote the number of carbons in a particular functional group. Thus, the functional group may include 'a' to 'b' carbon atoms. For example, "a $C_1$-$C_4$ alkyl group" denotes an alkyl group having 1 to 4 carbon atoms, and examples of the $C_1$-$C_4$ alkyl group may include $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and $(CH_3)_3C$—.

As used herein, a particular radical may refer to a mono-radical or a di-radical depending on the context. For example, when a substituent needs two binding sites for binding with the rest of the molecule, the substituent may be understood as a di-radical. For example, a substituent specified as an alkyl group that needs two binding sites may be a di-radical, such as —$CH_2$—, —$CH_2CH_2$—, or —$CH_2CH(CH_3)CH_2$—. The term "alkylene" indicates that the radical means a di-radical.

As used herein, the term "alkyl group" or "alkylene group" refers to a branched or non-branched aliphatic hydrocarbon group. For example, the alkyl group may be substituted or not. Non-limiting examples of the alkyl group are a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted or not. In some embodiments, the alkyl group may have 1 to 6 carbon atoms. For example, a $C_1$-$C_6$ alkyl group may be a methyl group, an ethyl group, a propyl group, an iso-propyl group, a butyl group, an iso-butyl group, a sec-butyl group, a pentyl group, a 3-pentyl group, a hexyl group, or the like, but is not limited thereto.

As used herein, the term "cycloalkyl group" refers to a carbocyclic ring or ring system that is fully saturated. For example, the cycloalkyl group may refer to a cyclopropyl group, a cyclobutyl group, a cyclopentyl group, a cyclohexyl group, or the like.

As used herein, the term "alkenyl group" refers to a hydrocarbon group including 2 to 20 carbon atoms with at least one carbon-carbon double bond. Non-limiting examples of the alkenyl group are an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexcenyl group, and a cycloheptenyl group. For example, these alkenyl groups may be substituted or not. For example, an alkenyl group may have 2 to 40 carbon atoms As used herein, the term "alkynyl group" refers to a hydrocarbon group including 2 to 20 carbon atoms with at least one carbon-carbon triple bond. Non-limiting examples of the alkynyl group are an ethynyl group, a 1-propynyl group, a 1-butynyl group, and a 2-butynyl group. For examples, these alkynyl groups may be substituted or not. For example, an alkynyl group may have 2 to 40 carbon atoms.

As used herein, the term "aromatic" refers to a ring or ring system with a conjugated T electron system, and may refer to a carbocyclic aromatic group (for example, a phenyl group) and a heterocyclic aromatic group (for example, a pyridine group). For example, an aromatic ring system as a whole may include a single ring or a fused polycyclic ring (i.e., a ring that shares adjacent atom pairs).

As used herein, the terms "aryl group" refers to an aromatic ring or ring system (i.e., a ring fused from at least two rings, which shares two or more adjacent carbon atoms) of at least two ring including only carbon atoms in its backbone. When the aryl group is a ring system, each ring in the ring system may be aromatic. Non-limiting examples of the aryl group are a phenyl group, a biphenyl group, a naphthyl group, a phenanthrenyl group, and a naphthacenyl group. These aryl groups may be substituted or not.

As used herein, the term "heteroaryl group" refers to an aromatic ring system with one or plural fused rings, in which at least one member of a ring is a heteroatom, i.e., not carbon. In the fused ring system, at least one heteroatom may be in one ring. For example, the heteroatom may be oxygen, sulfur, or nitrogen, etc. Non-limiting examples of the heteroaryl group are a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

As used herein, the terms "aralkyl group" or "alkylaryl group" refers to an aryl group linked to a substituent via an alkylene group, such as a $C_7$-$C_{14}$ aralkyl group. Non-limiting examples of the aralkyl group or alkylaryl group are a benzyl group, a 2-phenylethyl group, a 3-phenylpropyl group, and a naphthylalkyl group. For example, the alkylene group may be a lower alkylene group (i.e., a $C_1$-$C_4$ alkylene group).

As used herein, the terms "cycloalkenyl group" refers to a non-aromatic carbocyclic ring or ring system with at least one double bond. For example, the cycloalkenyl group may be a cyclohexcenyl group.

As used herein, the terms "heterocyclic group" refers to a non-aromatic ring or ring system including at least one heteroatom in its cyclic backbone.

As used herein, the term "halogen" refers to a stable atom belonging to Group 17 of the periodic tables of elements, for example, fluorine, chlorine, bromine, or iodine. For example, the halogen atom may be fluorine and/or chlorine.

As used herein, a substituent may be derived by substitution of at least one hydrogen atom in an unsubstituted mother group with another atom or a functional group. Unless stated otherwise, a substituted functional group refers to a functional group substituted with at least one substituent selected from a $C_1$-$C_{40}$ alkyl group, a $C_2$-$C_{40}$ alkenyl group, a $C_3$-$C_{40}$ cycloalkyl group, a $C_3$-$C_{40}$ cycloalkenyl group, a $C_1$-$C_{40}$ alkyl group, and a $C_7$-$C_{40}$ aryl group. When a functional group is "optionally" substituted, it means that the functional group may be substituted with such a substituent as listed above.

For example, the polymer may have a weight average molecular weight in a range of about 5,000 daltons to about 300,000 daltons, as measured by gel permeation chromatography (GPC) relative to polystyrene standards. For example, the polymer may have a weight average molecular weight in a range of about 5,000 daltons to about 200,000 daltons. For example, the polymer may have a weight average molecular weight in a range of about 5,000 daltons to about 100,000 daltons. For example, the polymer may have a weight average molecular weight in a range of about 10,000 daltons to about 100,000 daltons. For example, the polymer may have a weight average molecular weight in a range of about 15,000 daltons to about 100,000 daltons.

For example, the polymer may have a glass transition temperature (Tg) of −20° C. or higher. For example, the polymer may have a glass transition temperature Tg in a range of about −15° C. to about 100° C. For example, the polymer may have a glass transition temperature Tg in a range of about −10° C. to about 100° C. For example, the polymer may have a glass transition temperature Tg in a range of about −10° C. to about 100° C.

According to another embodiment, the electrolyte includes the polymer and a lithium salt.

The electrolyte including the polymer represented by one of Formulae 1 to 17 may be then able to provide improved ionic conductivity and thermal and mechanical properties. Therefore, a lithium battery including the electrolyte may also have improved properties.

In the electrolyte, a molar ratio of lithium in the lithium salt to a repeat unit including a heteroatom of the polymer represented by one of Formulae 1 to 17 may be in a range of about 1:1 to about 1:20. For example, in the electrolyte, a molar ratio of LiTFSi to an ethylene oxide repeat unit ((EO)n) may be in a range of about 1:1 to about 1:20 ([Li]:[EO]=1:1 to 1:20). For example, in the electrolyte, a molar ratio of LiTFSi to an ethylene oxide repeat unit (EO)n may be in a range of about 1:2 to about 1:15 ([Li]:[EO]=1:2 to 1:15). For example, in the electrolyte, a molar ratio of LiTFSi to an ethylene oxide repeat unit (EO)n may be in a range of about 1:2 to about 1:10 ([Li]:[EO]=1:2 to 1:10). For example, in the electrolyte, a molar ratio of LiTFSi to an ethylene oxide repeat unit (EO)n may be in a range of about 1:3 to about 1:10 ([Li]:[EO]=1:3 to 1:10).

In the electrolyte, the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N(LiFTSI)$, $LiC_4F_9SO_3$, $LAlO_2$, $LiAlCl_4$, $LiN(C_xF_{2x+1}SO_2)(C_yF_{2y+1}SO_2)$ (where $2≤x≤20$ and $2≤y≤20$), LiCl, and LiI, but embodiments are not limited thereto, and any material available as a lithium salt of an electrolyte in the art may be used. For example, the lithium salt may refer to LiTFSI.

The electrolyte including the polymer represented by one of Formulae 1 to 17 and the lithium salt may be a polymer electrolyte, such as a gel electrolyte or a solid or liquid electrolyte. When the polymer electrolyte contains no organic solvent or contains a small amount of an organic solvent, the electrolyte may be a gel electrolyte or a polymer electrolyte. The gel electrolyte or the solid electrolyte may be able to implement a self-standing film. The solid electrolyte is substantially free of liquid within electrolyte. In other words, the solid electrolyte does not intentionally comprise liquid such as solvent or ionic liquid.

The electrolyte may optionally include an organic solvent. The organic solvent included in the electrolyte may be a low-boiling point solvent. The low-boiling point solvent refers to a solvent having a boiling point of about 200° C. or lower at a temperature of about 25° C. at 1 atmosphere.

For example, the organic solvent included in the electrolyte may include at least one selected from a dialkylcarbonate, a cyclic carbonate, a linear or cyclic ester, a linear or cyclic amide, an alicyclic nitrile, a linear or cyclic ether, and a derivative thereof.

In one or more embodiments, the organic solvent may include at least one selected from dimethylcarbonate (DMC), ethylmethylcarbonate (EMC), methylpropylcarbonate, ethylpropylcarbonate, diethylcarbonate (DEC), dipropylcarbonate, propylenecarbonate (PC), ethylenecarbonate (EC), butylenecarbonate, ethylpropionate, ethylbutyrate, acetonitrile, succinonitrile (SN), dimethylsulfoxide, dimethylformamide, dimethylacetamide, γ-valerolactone, γ-butyrolactone, tetrahydrofuran, and the like. However, the organic solvent is not limited thereto, and may be any low-boiling point solvent available in the art.

The electrolyte may have an ionic conductivity of about $7×10^{-7}$ S/cm or higher at a temperature of about 20° C. For example, the electrolyte may have an ionic conductivity of about $1×10^{-6}$ S/cm or higher at a temperature of about 20° C. For example, the electrolyte may have an ionic conductivity of about $5.6×10^{-6}$ S/cm or higher at a temperature of about 20° C. For example, the electrolyte may have an ionic conductivity of about $6×10^{-6}$ S/cm or higher at a temperature of about 20° C. For example, the electrolyte may have an ionic conductivity of about $7×10^{-6}$ S/cm or higher. For example, the electrolyte may have an ionic conductivity of about $7×10^{-5}$ S/cm or higher at a temperature of about 20° C. For example, the electrolyte may have an ionic conductivity of about $7×10^{-4}$ S/cm or higher. For example, the electrolyte may have an ionic conductivity of about $7×10^{-4}$ S/cm or higher at a temperature of about 20° C. For example, the electrolyte may have an ionic conductivity of about $7×10^{-2}$ S/cm or higher.

The electrolyte may further include a crosslinking reaction product of the polymer represented by one of Formulae 1 to 17. In addition, the electrolyte may include a polymerization product that is polymerized by the crosslinkable function group of the polymer represented by one of Formulae 1 to 17. The polymerization product may be produced when the electrolyte is exposed to a proper crosslinking condition such as a high-temperature condition, UV radiation condition or the like.

According to another embodiment, a lithium battery includes: a cathode; a anode, and an electrolyte disposed between the cathode and the anode, and at least one of the cathode, the anode, and the electrolyte may include the polymer according to the above-described embodiments. The lithium battery may be, for example, a lithium primary battery, or a lithium secondary battery such as a lithium ion battery, a lithium ion polymer battery, a lithium sulfur battery, or the like. Further, a lithium battery includes: a cathode; a anode, and an electrolyte disposed between the cathode and the anode, and at least one of the cathode, the anode, and the electrolyte may include the polymer according to the above-described embodiments and further include a crosslinking reaction product of the polymer represented by one of Formulae 1 to 17. The polymerization product may be produced when the electrolyte or lithium battery comprising the electrolyte is exposed to a proper crosslinking condition such as high-temperature condition, UV radiation condition or the like.

For example, the anode of the lithium battery may include graphite. For example, the cathode in the lithium battery may include a lithium transition metal oxide having a nickel-containing layered structure. For example, the lithium battery may have a high voltage of about 3.80 V or higher. For example, the lithium battery may have a high voltage of about 4.0 V or higher. For example, the lithium battery may have a high voltage of about 4.35 V or higher.

The lithium battery may include a polymerization product of the polymer represented by one of Formulae 1 to 17. For example, the electrolyte in the lithium battery may include a polymerization product that is polymerized by the crosslinkable function group of the polymer represented by one of Formulae 1 to 17. The polymerization product may be produced when the electrolyte is exposed to a high-temperature condition or the like.

For example, the lithium battery may be prepared using a method described below.

Fist, a cathode is prepared.

For example, a cathode active material, a conducting agent, a binder, and a solvent may be mixed to prepare a cathode active material composition. The cathode active material may include the polymer represented by one of Formulae 1 to 17. The cathode active material composition may be directly coated on a metallic current collector to prepare a cathode plate. In one embodiment, the cathode active material composition may be cast on a separate support to form a cathode active material film, which may then be separated from the support and laminated on a metallic current collector to prepare a cathode plate. The cathode may be one of a variety of types.

The cathode active material may be, for example, a lithium-containing metal oxide, etc. For example, the cathode active material may be at least one composite oxide of lithium and a metal selected from cobalt, manganese, nickel, and a combination thereof. For example, the cathode active material may be a compound represented by one of the following formulae: $Li_aA_{1-b}B_bD_2$ (where $0.90 \leq a \leq 1.8$, and $0 \leq b \leq 0.5$), $Li_aE_{1-b}B_bO_{2-c}D_c$ (where $0.90 \leq a \leq 1.8$, $0 \leq b \leq 0.5$, $0 \leq c \leq 0.05$), $LiE_{2-b}B_bO_{4-c}D_c$ (where $0 \leq b \leq 0.5$, $0 \leq c \leq 0.05$), $Li_aNi_{1-b-c}Co_bB_cD_\alpha$ (where $0.90 \leq a \leq 1.8$, $0 \leq b \leq 0.5$, $0 \leq c \leq 0.05$, $0 < \alpha \leq 2$), $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, $0 < \alpha < 2$), $Li_aNi_{1-b-c}Co_bB_cO_{2-\alpha}F_2$ (where $0.90 \leq a \leq 1.8$, $0 \leq b \leq 0.5$, $0 \leq c \leq 0.05$, $0 < \alpha < 2$), $Li_aNi_{1-b-c}Mn_bB_cD_\alpha$ (where $0.90 \leq a \leq 1.8$, $0 \leq b \leq 0.5$, $0 \leq c \leq 0.05$, $0 < \alpha \leq 2$), $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, $0 < \alpha < 2$), $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, $0 < \alpha < 2$), $Li_aN_i_bE_cG_dO_2$ (where $0.90 \leq a \leq 1.8$, $0 \leq b \leq 0.9$, $0 \leq c \leq 0.5$, $0.001 \leq d \leq 0.1$), $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, $0.001 \leq e \leq 0.1$), $Li_aNiG_bO_2$ (where $0.90 \leq a \leq 1.8$, $0.001 \leq b \leq 0.1$), $Li_aCoG_bO_2$ (where $0.90 \leq a \leq 1.8$, $0.001 \leq b \leq 0.1$), $Li_aMnG_bO_2$ (where $0.90 \leq a \leq 1.8$, $0.001 \leq b \leq 0.1$), $Li_aMn_2G_bO_4$ (where $0.90 \leq a \leq 1.8$, $0.001 \leq b \leq 0.1$), $QO_2$, $QS_2$, $LiQS_2$, $V_2O_5$, $LiV_2O_5$, $LiIO_2$, $LiNiVO_4$, $Li_{(3-f)}J_2(PO_4)_3$ ($0 \leq f \leq 2$), $Li_{(3-f)}Fe_2(PO_4)_3$ ($0 \leq f \leq 2$), and $LiFePO_4$.

In the formulae above, A may be selected from the group of nickel (Ni), cobalt (Co), manganese (Mn), and combinations thereof, B may be selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof, D may be selected from the group of oxygen (O), fluorine (F), sulfur (S), phosphorus (P), and combinations thereof, E may be selected from the group of cobalt (Co), manganese (Mn), and combinations thereof, F may be selected from the group of fluorine (F), sulfur (S), phosphorus (P), and combinations thereof, G is selected from the group of aluminum (Al), chromium (Cr), manganese (Mn), iron (Fe), magnesium (Mg), lanthanum (La), cerium (Ce), strontium (Sr), vanadium (V), and combinations thereof, Q may be selected from the group of titanium (Ti), molybdenum (Mo), manganese (Mn), and combinations thereof, I may be selected from the group of chromium (Cr), vanadium (V), iron (Fe), scandium (Sc), yttrium (Y), and combinations thereof, and J may be selected from the group of vanadium (V), chromium (Cr), manganese (Mn), cobalt (Co), nickel (Ni), copper (Cu), and combinations thereof.

In some embodiments, the cathode active material may be $LiCoO_2$, $LiMn_xO_{2x}$ ($x=1$, 2), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), or $LiFePO_4$.

A lithium-containing metal oxide having a coating layer on surfaces thereof may be used as a cathode active material. In one embodiment, a mixture of a lithium-containing metal oxide without a coating layer and a lithium-containing metal oxide having a coating layer may be used. The coating layer may include at least one compound of a coating element selected from the group of oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using a suitable method that does not adversely affect the physical properties of the cathode active material when a compound of the coating element is used. For example, the coating layer may be formed using a spray coating method, a dipping method, or the like. This is obvious to those of skill in the art, and thus a detailed description thereof will be omitted.

The conducting agent may be, for example, carbon black or graphite particulates, or another suitable conducting agent.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, a styrene butadiene rubber polymer, or another suitable material available as a binding agent.

Examples of the solvent are N-methyl-pyrrolidone, acetone, water, or another suitable material available as a solvent.

The amounts of the cathode active material, the conducting agent, the binder, and the solvent may be in suitable ranges. The conducting agent, the binder, or the solvent may not be used according to the use and the structure of the lithium battery.

Next, an anode may be prepared.

For example, an anode active material, a conducting agent, a binder, and a solvent may be mixed to prepare an anode active material composition. The anode active material composition may include the polymer represented by one of Formulae 1 to 17. The anode active material composition is directly coated on a metallic current collector and dried to prepare an anode plate. In another implementation, the anode active material composition may be cast on a separate support to form an anode active material film, which may then be separated from the support and laminated on a metallic current collector to prepare an anode plate.

The anode active material may be a suitable anode active material for a lithium battery. For example, the anode active material may include at least one selected from the group of lithium metal, a metal that is alloyable with lithium, a transition metal oxide, a non-transition metal oxide, and a carbonaceous material.

Examples of the metal alloyable with lithium are Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), indium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Examples of the transition metal oxide are a lithium titanium oxide, a vanadium oxide, a lithium vanadium oxide, and the like.

For example, the non-transition metal oxide may be $SnO_2$, or $SiO_x$ ($0<x<2$).

Examples of the carbonaceous material are crystalline carbon, amorphous carbon, and mixtures thereof. Examples of the crystalline carbon are graphite, such as natural graphite or artificial graphite that are in amorphous, plate, flake, spherical or fibrous form. Examples of the amorphous carbon are soft carbon (carbon sintered at low temperatures), hard carbon, meso-phase pitch carbides, sintered corks, and the like.

The conducting agent, the binder, and the solvent used for the anode active material composition may be the same as those used for the cathode active material composition.

Suitable amounts of the anode electrode active material, the conducting agent, the binder, and the solvent may be used. The conducting agent, the binder, or the solvent may not be used according to the use and the structure of the lithium battery.

Next, a separator may be prepared, to be disposed between the cathode and the anode.

The separator may be a suitable separator for use in lithium batteries. The separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. In another implementation, the separator composition may be cast on a support and then dried to form a separator film, which may then be separated from the support and laminated on an electrode to form the separator.

The polymer resin used to manufacture the separator may be a suitable material for use as a binder for electrode plates. Examples of the polymer resin are a vinylidenefluoride/hexafluoropropylene copolymer, polyvinylidene fluoride (PVDF), polyacrylonitrile, polymethylmethacrylate, and a mixture thereof.

Next, the electrolyte described in the previous embodiments may be prepared.

The electrolyte may be a polymer electrolyte including the polymer. Depending on an amount of the electrolyte, the electrolyte may be a liquid electrode or a solid electrode. To prepare the electrolyte, a polymer electrolyte composition may be prepared first by mixing a lithium salt with the polymer represented by one of Formulae 1 to 17. For example, the polymer represented by one of Formulae 1 to 17 and the lithium salt are added to an organic solvent to prepare a polymer electrolyte composition. After the polymer electrolyte composition is directly coated on the cathode or the anode, and then, the solvent may be removed, so as to form an electrolyte film. In one or more embodiments, the polymer electrolyte composition may be cast on a separate support, and then, the solvent may be removed. Accordingly, an electrolyte film may be separated from the support. In one or more embodiments, the polymer may be melted by heating, and then, a lithium salt may be added thereto to form a polymer electrolyte composition. The polymer electrolyte composition may be cooled to prepare an electrolyte film without using an organic solvent. The electrolyte is not limited to the above-described form, and may be in a form other than the above-described form.

The electrolyte may be impregnated with the separator. For example, the electrolyte may be laminated on the separator to form a laminate. Then, both surfaces of the laminate may be compressed to prepare an electrolyte impregnated with the separator. In one or more embodiments, the electrolyte may be disposed on at least one surface of the separator. For example, an electrolyte film may be disposed on one surface or both surfaces of the separator to prepare a laminate. In one or more embodiments, the electrolyte may be used instead of the separator. For example, instead of the separator, a solid electrolyte film may be used.

Referring to FIG. 1, a lithium battery 1 includes a cathode 3, an anode 2, and a separator 4. The electrolyte (not shown) may be impregnated into holes in the separator 4. Then, the battery case 5 may be filled with an organic electrolytic solution and sealed with a cap assembly 6, thereby completing the manufacture of the lithium battery 1. The battery case 5 may be, for example, a cylindrical type, a rectangular type, a thin-film type, or the like.

The separator may be interposed between the cathode and the anode to form a battery assembly. In another implementation, the battery assembly may be stacked in a bi-cell structure and impregnated with the electrolytic solution. The resultant may be put into a pouch and hermetically sealed, thereby completing the manufacture of a lithium battery.

In one or more embodiments, a plurality of battery assemblies may be stacked to form a battery pack, which may be used in a device that operates at high temperatures and requires high output, for example, in a laptop computer, a smart phone, or an electric vehicle.

The lithium battery may have improved lifetime characteristics and high rate characteristics, and thus may be applicable in an electric vehicle (EV), for example, in a hybrid vehicle such as plug-in hybrid electric vehicle (PHEV). The lithium battery may be applicable to the high-power storage field, or, for example, in an electric bicycle or a power tool.

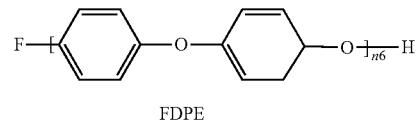

FDPE

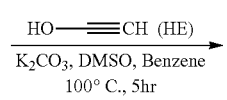

MODE OF DISCLOSURE

Hereinafter, one or more embodiments of the present invention will be described in detail with reference to the following examples. However, these examples are not intended to limit the scope of the one or more embodiments of the present disclosure.

Synthesis of Additives

Example 1: Synthesis of Compound of Formula 5-1

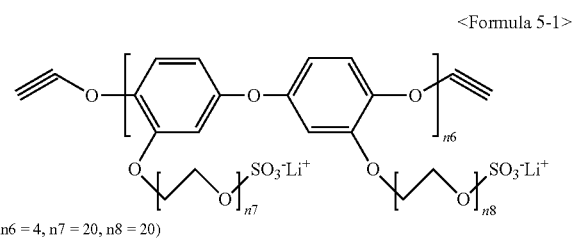

(n6 = 4, n7 = 20, n8 = 20)

(Synthesis Scheme)
Step 1:

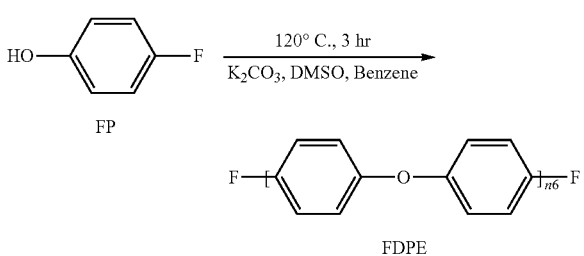

Dimethylsulfoxide (DMSO) and benzene were added under nitrogen atmosphere to a round bottom flask equipped with a Dean-Start trap and a condenser. Then, 1 M 4-fluorophenol (FP) and 1 M $K_2CO_3$ were added to the mixed solution, and a reaction was carried out for 3 hours at a temperature of 120° C., thereby obtaining 4,4'-difluorobiphenylether (FDPE).

Step 2:

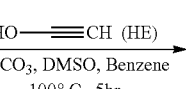

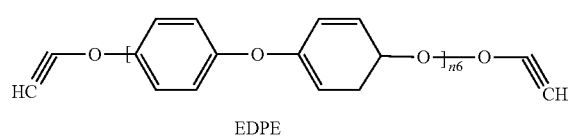

EDPE

DMSO and benzene were added under nitrogen atmosphere to a round bottom flask equipped with a Dean-Start trap and a condenser. Then, 1 M 4,4'-FDPE, 2 M hydroxyethyl (HE) (or hydroxyacetylene), and 1 M K₂CO₃ were added to the mixed solution, and a reaction was carried out for 5 hours at a temperature of 100° C., thereby obtaining 4,4'-ethynyloxybiphenylether (EDPE).

Step 3:

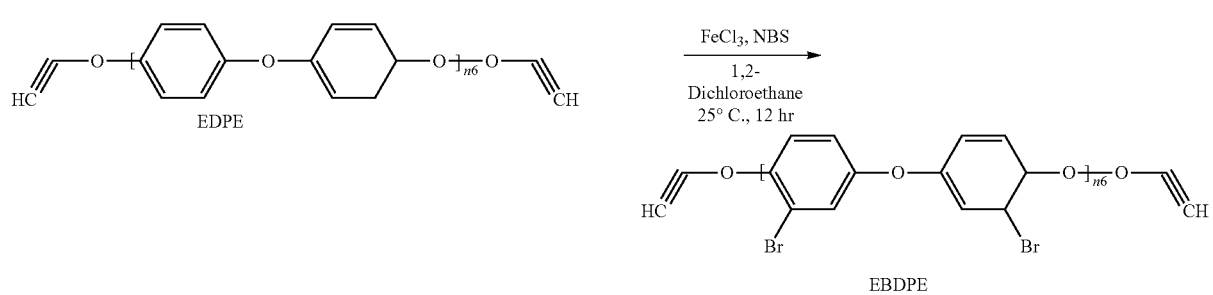

1,2-dichloroethane was added under nitrogen atmosphere to a round bottom flask equipped with a condenser. Then, 1 M 4,4'-EDPE, 2.1 M N-bromosuccinimide (NBS), and 0.4 M FeCl₃ were added to the mixed solution, and a reaction was carried out for 12 hours at a temperature of 25° C., thereby obtaining ethynyl-3,3'-dibromobiphenylether (EBDPE).

Step 4:

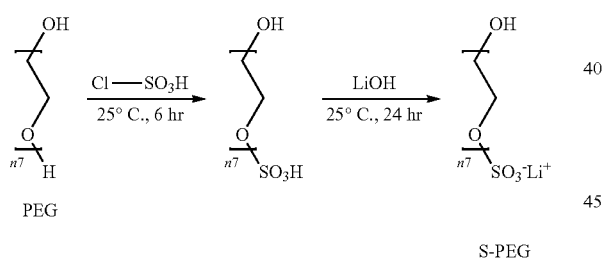

Polyethylene glycol (PEG) and ClSO₃H were added under nitrogen atmosphere to a round bottom flask equipped with a condenser, and a reaction was carried out for 6 hours at a temperature of 25° C. Then, 1 M LiOH was added to the reaction product, and the mixed reaction product was stirred for 24 hours at a temperature of 25° C., thereby obtaining lithium sulfonate-polyethylene glycol (S-PEG).

Step 5:

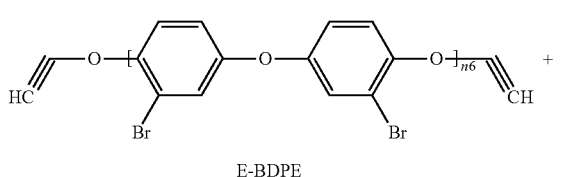

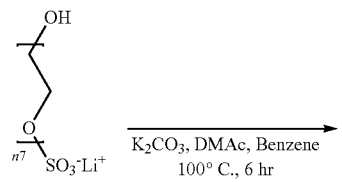

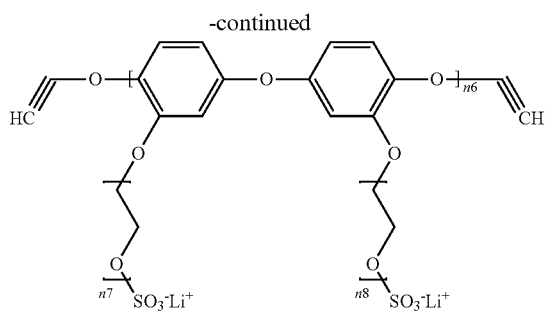

Dimethylacetamide (DMAc) and benzene were added under nitrogen atmosphere to a round bottom flask equipped with a Dean-Start trap and a condenser. Then, 1 M EBDPE, 2 M S-PEG, and 1.2 M K₂CO₃ were added to the mixed solution, and a reaction was carried out for 6 hours at a temperature of 100° C., thereby obtaining a compound of Formula 5-1.

Example 2: Synthesis of Compound of Formula 5-2

A compound of Formula 5-2 was prepared in the same manner as in Example 1, except that the value of the re at unit n6 was changed from 4 to 8.

<Formula 5-2>

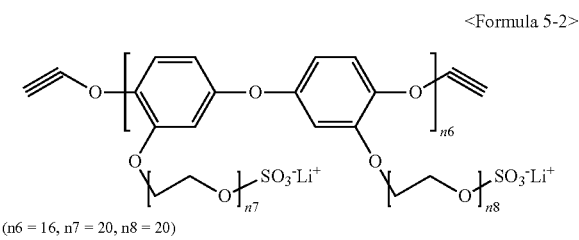

(n6 = 16, n7 = 20, n8 = 20)

Example 3: Synthesis of Compound of Formula 5-3

A compound of Formula 5-3 was prepared in the same manner as in Example 1, except that the value of the repeat unit n6 was changed from 4 to 16.

<Formula 5-3>

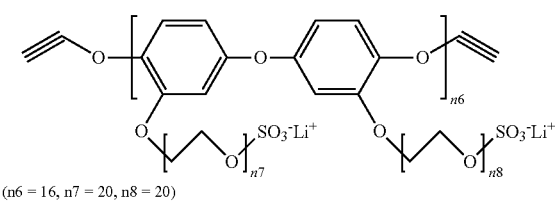

(n6 = 16, n7 = 20, n8 = 20)

Example 4: Synthesis of Compound of Formula 5-4

A compound of Formula 5-4 was prepared in the same manner as in Example 1, except that the value of the repeat unit n6 was changed from 4 to 9 and the values of the re at units n7 and n8 were changed from 20 to 50.

<Formula 5-4>

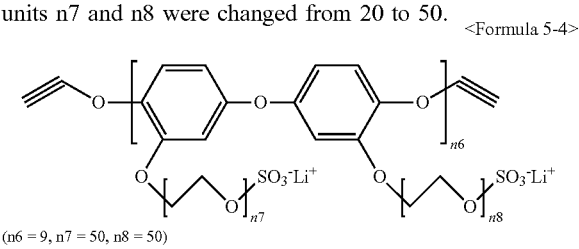

(n6 = 9, n7 = 50, n8 = 50)

Example 5: Synthesis of Compound of Formula 5-5

A compound of Formula 5-5 was prepared in the same manner as in Example 1, except that the value of the repeat unit n6 was changed from 4 to 9 and the values of the repeat units n7 and n8 were changed from 20 to 70.

<Formula 5-5>

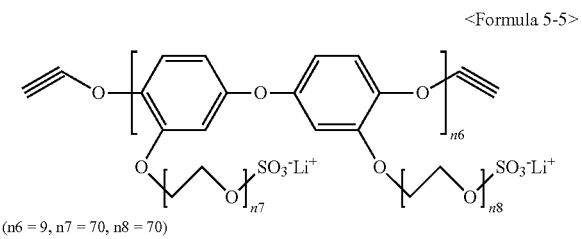

(n6 = 9, n7 = 70, n8 = 70)

Example 6: Synthesis of Compound of Formula 9-1

A compound of Formula 9-1 was prepared in the same manner as in Example 1, except that the ether linking group was changed to a dimethylethane linking group, and that the value of the repeat unit n6 was changed from 4 to 9 and the values of the repeat units n7 and n8 were changed from 20 to 50.

<Formula 9-1>

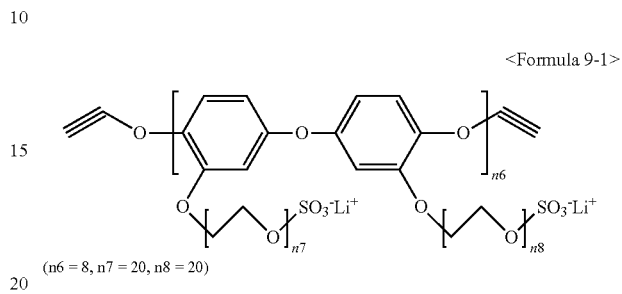

(n6 = 8, n7 = 20, n8 = 20)

Example 7: Synthesis of Compound of Formula 6-1

A compound of Formula 6-1 was prepared in the same manner as in Example 1, except that the terminal substituent was changed from the acetylenyl group to a trifluoroethylenyl group, and that the value of the repeat unit n6 was changed from 4 to 9 and the values of the repeat units n7 and n8 were changed from 20 to 50.

<Formula 6-1>

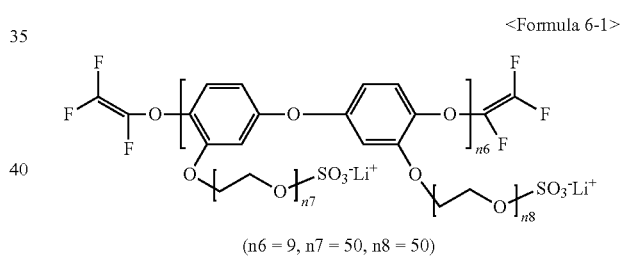

(n6 = 9, n7 = 50, n8 = 50)

Example 8: Synthesis of Compound of Formula 7-1

A compound of Formula 7-1 was prepared in the same manner as in Example 1, except that the terminal substituent was changed from the acetylenyl group to an ethylenyl group, and that the value of the repeat unit n6 was changed from 4 to 9 and the values of the repeat units n7 and n8 were changed from 20 to 50.

<Formula 7-1>

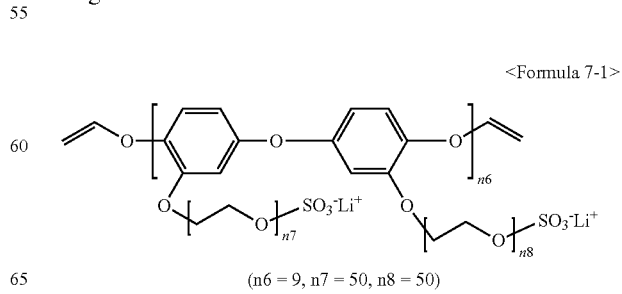

(n6 = 9, n7 = 50, n8 = 50)

Example 9: Synthesis of Compound of Formula 5-6

A compound of Formula 5-6 was prepared in the same manner as in Example 1, except that HO—C$_6$H$_5$—C≡CH was used instead of HO—C≡CH in Step 2.

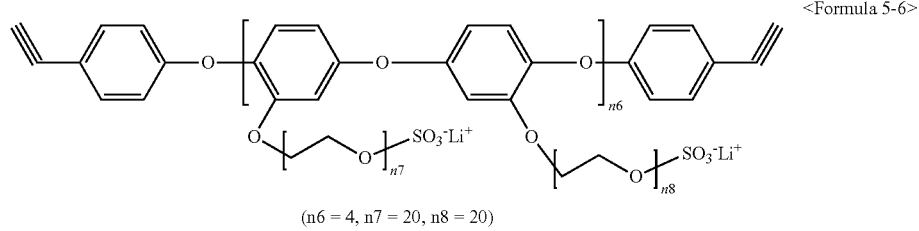

<Formula 5-6>

(n6 = 4, n7 = 20, n8 = 20)

Comparative Example 1: PEO

Polyethylene oxide (PEO, Mw=100,000, Aldrich, 181986) was directly obtained and used.

Preparation of Electrolyte

Example 10: Formula 5-1 and EO:Li=6:1

1.15 g of the compound of Formula 5-1 prepared according to Example 1 was dissolved in 50 ml of acetonitrile to obtain a polymer solution. Here, LiTFSi was added thereto to have a molar ratio of [EO]:[Li] of 6:1. After the mixed solution was dissolved by stirring, the resultant was poured into a Teflon dish, dried in a drying room for 2 days at room temperature, and then, further vacuum-dried (60° C., overnight), thereby obtain a film-type ionic-conducting polymer electrolyte (hereinafter, referred to as an electrolyte film) from which the solvent was removed. The obtained electrolyte film was solid at a temperature of 25° C., and was substantially solvent-free.

<Formula 5-1>

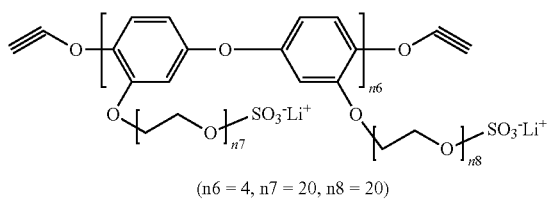

(n6 = 4, n7 = 20, n8 = 20)

Example 11: Compound of Formula 5-2 (EO:Li=6:1)

An electrolyte film was prepared in the same manner as in Example 10, except that the polymer of Formula 5-2 was used instead of the polymer of Formula 5-1. The obtained electrolyte film was solid at a temperature of 25° C.

<Formula 5-2>

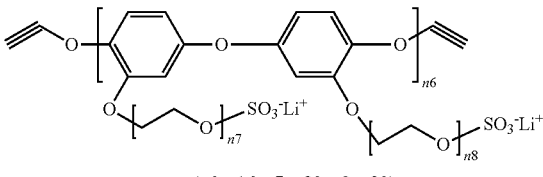

(n6 = 8, n7 = 20, n8 = 20)

Example 12: Formula 5-3, EO:Li=6:1

An electrolyte film was prepared in the same manner as in Example 10, except that the polymer of Formula 5-3 was used instead of the polymer of Formula 5-1. The obtained electrolyte film was solid at a temperature of 25° C.

<Formula 5-3>

(n6 = 16, n7 = 20, n8 = 20)

Example 13: Formula 5-4, EO:Li=6:1

An electrolyte film was prepared in the same manner as in Example 10, except that the polymer of Formula 5-4 was used instead of the polymer of Formula 5-1. The obtained electrolyte film was solid at a temperature of 25° C.

<Formula 5-4>

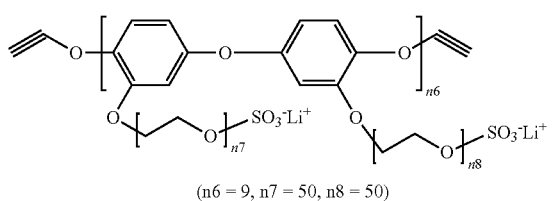

(n6 = 9, n7 = 50, n8 = 50)

Example 14: Formula 5-5, EO:Li=6:1

An electrolyte film was prepared in the same manner as in Example 10, except that the polymer of Formula 5-5 was used instead of the polymer of Formula 5-1. The obtained electrolyte film was solid at a temperature of 25° C.

<Formula 5-5>

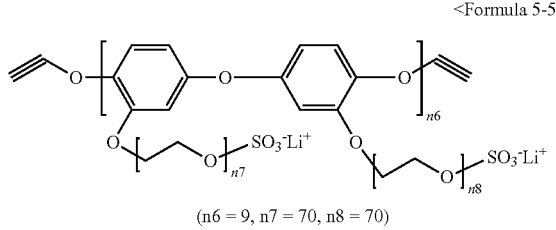

(n6 = 9, n7 = 70, n8 = 70)

Example 15: Formula 9-1, EO:Li=6:1

An electrolyte film was prepared in the same manner as in Example 10, except that the polymer of Formula 9-1 was used instead of the polymer of Formula 5-1. The obtained electrolyte film was solid at a temperature of 25° C.

<Formula 9-1>

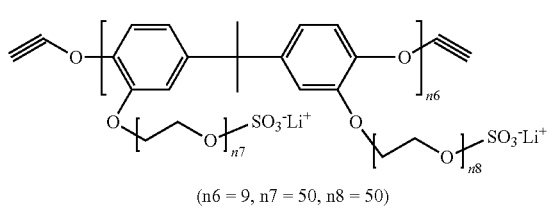

(n6 = 9, n7 = 50, n8 = 50)

Example 16: Formula 6-1, EO:Li=6:1

An electrolyte film was prepared in the same manner as in Example 10, except that the polymer of Formula 6-1 was used instead of the polymer of Formula 5-1. The obtained electrolyte film was solid at a temperature of 25° C.

<Formula 6-1>

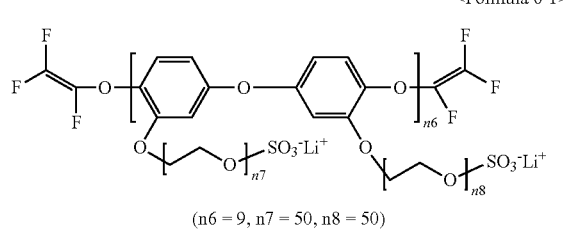

(n6 = 9, n7 = 50, n8 = 50)

Example 17: Formula 7-1, EO:Li=6:1

An electrolyte film was prepared in the same manner as in Example 10, except that the polymer of Formula 7-1 was used instead of the polymer of Formula 5-1. The obtained electrolyte film was solid at a temperature of 25° C.

<Formula 7-1>

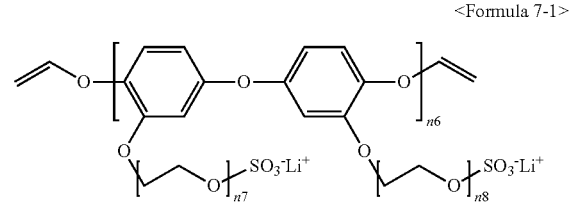

(n6 = 9, n7 = 50, n8 = 50)

Example 18: Formula 5-6, EO:Li=6:1

An electrolyte film was prepared in the same manner as in Example 10, except that the polymer of Formula 5-6 was used instead of the polymer of Formula 5-1. The obtained electrolyte film was solid at a temperature of 25° C.

<Formula 5-6>

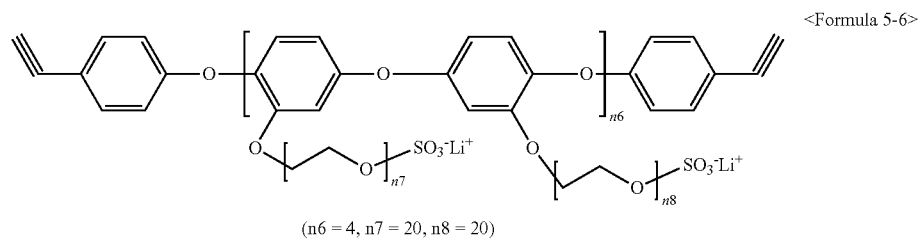

(n6 = 4, n7 = 20, n8 = 20)

Comparative Example 2: PEO, EO:Li=6:1

An electrolyte film was prepared in the same manner as in Example 10, except that PEO (Mw=100,000, Aldrich, 181986) was used instead of the polymer of Formula 5-1. The obtained electrolyte film was solid at a temperature of 25° C.

Preparation of Lithium Battery

Example 19

Preparation of Anode

About 98 wt % of artificial graphite (BSG-L, available from Tianjin BTR New Energy Technology Co., Ltd.), about 1.0 wt % of styrene-butadiene rubber (SBR) binder (available from ZEON), and about 1.0 wt % of carboxymethylcellulose (CMC, available from NIPPON A&L) were mixed with distilled water and stirred using a mechanical stirrer for about 60 minutes to prepare an anode active material slurry. The anode active material slurry was coated on a 10 μm-thick Cu current collector to a thickness of about 60 μm with a doctor blade. Then, the resultant was dried in a hot-air dryer at a temperature of about 100° C. for about 0.5 hour, and then at a temperature of about 120° C. in a vacuum for 4 hours, followed by roll-pressing to prepare an anode plate.

Preparation of Cathode

About 97.45 wt % of $LiNi_{1/3}Co_{1/3}Mn_{1/3}O_2$, about 0.5 wt % of artificial graphite (SFG6, available from Timcal) powder as a conducting agent, about 0.7 wt % of carbon black (Ketjen black, available from ECP), about 0.25 wt % of modified acrylonitrile rubber (BM-720H, available from Zeon Corporation), about 0.9 wt % of polyvinylidenefluoride (PVdF, S6020, available from Solvay), and about 0.2 wt % of polyvinylidenefluoride (PVdF, S5130, available from Solvay) were mixed with N-methyl-2-pyrolidone as a solvent and stirred for about 30 minutes to prepare a cathode active material slurry. The cathode active material slurry was coated on a 20 μm-thick aluminum (Al) current collector to a thickness of about 60 μm with a doctor blade. Then, the resultant was dried in a hot-air dryer at about 100° C. for about 0.5 hour, and then at about 120° C. in a vacuum for 4 hours, followed by roll-pressing to manufacture a cathode plate.

The electrolyte film prepared according to Example 10 was disposed between the cathode and the anode to prepare a lithium battery.

Examples 20 to 27

Lithium batteries were manufactured in the same manner as in Example 19, except that each of the electrolyte films prepared according to Examples 11 to 18 was used instead of the electrolyte film prepared according to Example 10.

Comparative Example 3

A lithium battery was manufactured in the same manner as in Example 19, except that the electrolyte film prepared according to Comparative Example 2 was used instead of the electrolyte film prepared according to Example 10.

Evaluation Example 1: Measurement of Ionic Conductivity

In order to measure conductivity, impedance of each of the electrolyte films prepared according to Examples 10 to 17 and Comparative Example 2 was measured first using an impedance analyzer (Solartron 1260A Impedance/Gain-Phase Analyzer) at a temperature of 25° C. according to a 2-probe method. Here, the current density was 0.4 A/cm², the amplitude was ±10 mV, and the frequency range was in a range of about 0.1 Hz to about 10 KHz. Based on the impedance measurement results obtained from the electrolyte films prepared according to Examples 10 to 17 and Comparative Example 2, the ionic conductivity thereof was derived. The measurement results are shown in Table 1.

Evaluation Example 2: Measurement of Thermal Stability

A glass transition temperature Tg and a decomposition temperature ($T_d$) of each of the electrolyte films prepared according to Examples 10 to 17 and Comparative Example 2 were measured using a dynamic scanning calorimeter (DSC). The measurement results are shown in Table 1.

Evaluation Example 3: Measurement of Tensile Properties

According to the instrumented indentation test using a device (Triboindenter by Hysitron company) equipped with a Berkovich tip as an indentation tip, Young's modulus and hardness of each of the electrolyte films prepared according to Examples 10 to 17 and Comparative Example 2 were measured. The measurement results are shown in Table 1.

TABLE 1

| | Weight average molecular weight [Dalton] | n6 | n7 | n8 | Ionic conductivity [S/cm] | Tg [° C.] | Td [° C.] | Young's modulus | Hardness |
|---|---|---|---|---|---|---|---|---|---|
| Comparative Example 2 | 100,000 | — | — | — | $5.5 \times 10^{-6}$ | −72 | 160 | 0.6646 | 0.0378 |
| Example 10 | 8,800 | 4 | 20 | 20 | $3.9 \times 10^{-6}$ | 3 | 183 | 0.1015 | 0.0128 |
| Example 11 | 17,600 | 8 | 20 | 20 | $5.7 \times 10^{-6}$ | 17 | 207 | 0.4527 | 0.0473 |
| Example 12 | 35,200 | 16 | 20 | 20 | $7.6 \times 10^{-7}$ | 98 | 325 | 0.2510 | 0.0810 |
| Example 13 | 44,000 | 9 | 50 | 20 | $6.2 \times 10^{-6}$ | 1 | 189 | 0.7713 | 00502 |
| Example 14 | 61,600 | 9 | 70 | 20 | $5.6 \times 10^{-6}$ | 8 | 205 | 0.7035 | 0.0427 |
| Example 15 | 46,500 | 9 | 50 | 20 | $5.8 \times 10^{-6}$ | 5 | 216 | 0.7512 | 0.0510 |
| Example 16 | 43,000 | 9 | 50 | 20 | $7.5 \times 10^{-6}$ | −4 | 178 | 0.8110 | 0.0531 |
| Example 17 | 44,000 | 9 | 50 | 20 | $7.3 \times 10^{-6}$ | −5 | 185 | 0.81017 | 0.0517 |

As shown in Table 1, it was confirmed that the electrolyte films of Examples 10 to 17 showed improved thermal and mechanical characteristics based on a higher glass transition temperature Tg, a higher decomposition temperature Td, and an increased hardness value that those of the electrolyte film of Comparative Example 2.

In addition, the electrolyte films of Examples 10 to 17 showed high ionic conductivity of at least $7.6 \times 10^{-7}$ S/cm, and depending on the values of n6, n7, and n8, the ionic conductivity, the Young's modulus, the hardness, and the glass transition temperature Tg, and the like were able to be controlled.

Evaluation Example 4: Evaluation of Charge-Discharge Characteristics at Room Temperature (25° C.

A charge-discharge cycle was performed as follows: each of the lithium batteries prepared according to Examples 19 to 27 was charged at a constant current of 0.2 C rate at about 25° C. to a voltage of about 4.2 V, and then charged at a constant voltage of about 4.2 V to a current of 0.05 C (cut-off current), followed by discharging with a constant current of 0.2 C until the voltage reached about 2.85 V (vs. Li), thereby confirming the operation of the lithium batteries.

INDUSTRIAL AVAILABILITY

When an electrolyte including a polymer with a novel structure is used, the electrolyte may have improved ionic conductivity and thermal and mechanical properties.

The invention claimed is:
1. A polymer represented by Formula 1:

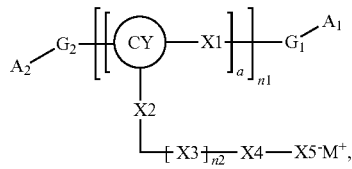

<Formula 1> wherein, in Formula 1,
CY and X1 are each independently the same or different within each repeating unit corresponding to a,
CY is a 6-membered to 30-membered ring group having 2 to 30 carbon atoms, and selectively, one or more heteroatoms, in which the 6-membered to 30-membered ring group comprises an unsubstituted or substituted $C_3$-$C_{30}$ cycloalkyl ring, an unsubstituted or substituted $C_3$-$C_{30}$ heterocycloalkyl ring, an unsubstituted or substituted $C_6$-$C_{30}$ aryl ring, or an unsubstituted or substituted $C_2$-$C_{30}$ heteroaryl ring,
X1 is a covalent bond, an unsubstituted or substituted $C_1$-$C_4$ alkylene group, or a heteroatom-containing linking group, wherein the heteroatom-containing linking group is —O—, —S—, —S(=O), —Si($E_1$)($E_2$)-, —P(=O)($E_3$)-, or a $C_6$-$C_{20}$ aryl group unsubstituted or substituted with halogen, and $E_1$, $E_2$, and $E_3$ are each independently hydrogen, halogen, or a $C_1$-$C_{10}$ alkyl group unsubstituted or substituted with halogen,
X2 and X4 are each independently a covalent bond, an unsubstituted or B substituted $C_1$-$C_4$ alkylene group, or a heteroatom-containing linking group,
X3 is a repeat unit having a heteroatom,
$X5^-$ is an anionic functional group,
$M^+$ is a cation,
$G_1$ and $G_2$ are each independently —O—, —S—, or —O—$C_6H_5$—,
$A_1$ and $A_2$ are each independently a crosslinkable functional group,
a is an integer from 2 to 5,
n1 is an integer from 1 to 100, and
n2 is an integer from 1 to 300.
2. The polymer of claim 1, wherein substituents of the $C_3$-$C_{30}$ cycloalkyl ring, the $C_3$-$C_{30}$ heterocycloalkyl ring, the $C_6$-$C_{30}$ aryl ring, the $C_2$-$C_{30}$ heteroaryl ring, and the $C_1$-$C_4$ alkylene group are each independently a polar functional group comprising hydrogen, halogen, a $C_1$-$C_{20}$ alkyl group unsubstituted or substituted with halogen, a $C_2$-$C_{20}$ alkenyl group unsubstituted or substituted with halogen, a $C_2$-$C_{20}$ alkynyl group unsubstituted or substituted with halogen, a $C_3$-$C_{20}$ cycloalkenyl group unsubstituted or substituted with halogen, a $C_3$-$C_{20}$ heterocyclyl group unsubstituted or substituted with halogen, a $C_6$-$C_{40}$ aryl group unsubstituted or substituted with halogen, a $C_2$-$C_{40}$ heteroaryl group unsubstituted or substituted with halogen, or one or more heteroatoms.
3. The polymer of claim 1, wherein the polymer is represented by Formula 2:

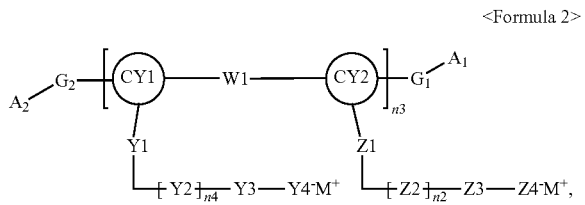

<Formula 2> wherein, in Formula 2,
CY1 and CY2 each independently comprise an unsubstituted or substituted $C_6$-$C_{30}$ cycloalkyl ring, an unsubstituted or substituted $C_3$-$C_{30}$ heterocycloalkyl ring, an unsubstituted or substituted $C_6$-$C_{30}$ aryl ring, or an unsubstituted or substituted $C_2$-$C_{30}$ heteroaryl ring,
W1 is a covalent bond, an unsubstituted or substituted $C_1$-$C_4$ alkylene group, or a heteroatom-containing linking group, wherein the heteroatom-containing linking group is —O—, —S—, —S(=O), —Si($E_1$)$E_2$)-, —P(=O)($E_3$)-, or a $C_6$-$C_{20}$ aryl group unsubstituted or substituted with halogen, and $E_1$, $E_2$, and $E_3$ are each independently hydrogen, halogen, or a $C_1$-$C_{10}$ alkyl group unsubstituted or substituted with halogen,
Y1, Y3, Z1, and Z3 are each independently a covalent bond, an unsubstituted or substituted $C_1$-$C_4$ alkylene group, or a heteroatom-containing linking group,
Y2 and Z2 are each independently a repeat unit having a heteroatom,
$Y4^-$ and $Z4^-$ are each independently an anionic functional group,
$M^+$ is a cation,
$G_1$ and $G_2$ are each independently —O—, —S—, or —O—$C_6H_5$—,
$A_1$ and $A_2$ are each independently a crosslinkable functional group,
n3 is an integer from 1 to 100, and
n4 and n5 are each independently an integer from 1 to 300.

4. The polymer of claim 1, wherein the polymer is represented by Formula 3:

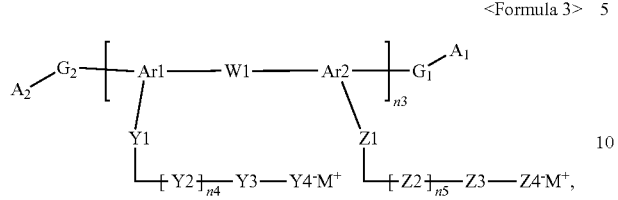
<Formula 3> wherein, in Formula 3,
$Ar_1$ and $Ar_2$ each independently comprise an unsubstituted or substituted $C_6$-$C_{30}$ aryl ring or an unsubstituted or substituted $C_2$-$C_{30}$ heteroaryl ring,
W1 is a covalent bond, an unsubstituted or substituted $C_1$-$C_4$ alkylene group, or a heteroatom-containing linking group, wherein the heteroatom-containing linking group is —O—, —S—, —S(=O)—, —Si($E_1$)($E_2$)-, —P(=O)($E_3$)-, or a $C_6$-$C_{20}$ aryl group unsubstituted or substituted with halogen, and $E_1$, $E_2$, and $E_3$ are each independently hydrogen, halogen, or a $C_1$-$C_{10}$ alkyl group unsubstituted or substituted with halogen,
Y1, Y3, Z1, and Z3 are each independently a covalent bond, an unsubstituted or B substituted $C_1$-$C_4$ alkylene group, or a heteroatom-containing linking group,
Y2 and Z2 are each independently a repeat unit having a heteroatom,
$Y4^-$ and $Z4^-$ are each independently an anionic function group,
$M^+$ is a cation,
$G_1$ and $G_2$ are each independently —O—, —S—, or —O—$C_6H_5$—,
$A_1$ and $A_2$ are each independently a crosslinkable functional group,
n3 is an integer from 1 to 100, and
n4 and n5 are each independently an integer from 1 to 300.

5. The polymer of claim 1, wherein the polymer is represented by Formula 4:

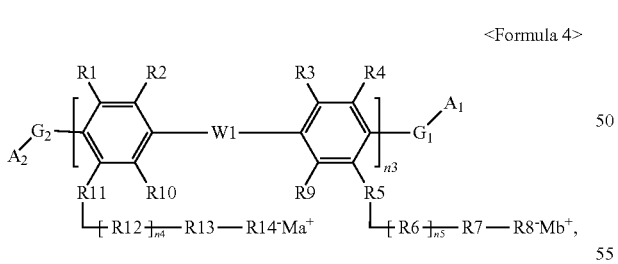
<Formula 4> wherein, in Formula 4,
R1, R2, R3, R4, R9, and R10 are each independently hydrogen, halogen, a $C_1$-$C_5$ alkyl group unsubstituted or substituted with halogen, or a $C_6$-$C_{20}$ aryl group unsubstituted or substituted with halogen,
W1 is a covalent bond, an unsubstituted or substituted $C_1$-$C_4$ alkylene group, or a heteroatom-containing linking group, wherein the heteroatom-containing linking group is —O—, —S—, —S(=O)—, —Si($E_1$)($E_2$)-, —P(=O)($E_3$)-, or a $C_6$-$C_{20}$ aryl group unsubstituted or substituted with halogen, and $E_1$, $E_2$, and $E_3$ are each independently hydrogen, halogen, or a $C_1$-$C_{10}$ alkyl group unsubstituted or substituted with halogen, R5, R7, R11, and R13 are each independently a covalent bond, an unsubstituted or substituted $C_1$-$C_4$ alkylene group, or a heteroatom-containing linking group,
R6 and R12 are each independently —R15-O— or —C(=O)O—,
R15 is a $C_2$-$C_{10}$ alkylene group unsubstituted or substituted with halogen,
$R8^-$ and $R14^-$ are each independently —$SO_3^-$, —$CO_2^-$, or —P(=O)(OH)$O^-$,
$Ma^+$ and $Mb^+$ are each independently a hydrogen ion or an alkali metal cation,
$G_1$ and $G_2$ are each independently —O—, —S—, or —O—$C_6H_5$—,
$A_1$ and $A_2$ are each independently a crosslinkable functional group,
n3 is an integer from 1 to 100, and
n4 and n5 are each independently an integer from 1 to 300.

6. The polymer of claim 1, wherein the crosslinkable functional group is a vinyl group unsubstituted or substituted with halogen, an aryl group unsubstituted or substituted with halogen, an ethynyl group unsubstituted or substituted with halogen, or an epoxy group unsubstituted or substituted with halogen.

7. The polymer of claim 1, wherein, in X2 and X4, the heteroatom-containing linking group is —O—, —S—, —S(=O)—, —S(=O)$_2$—, —C(=O)—, —Si($E_1$)($E_2$)-, or —P(=O)($E_3$)-, and $E_1$, $E_2$, and $E_3$ are each independently hydrogen, halogen, a $C_1$-$C_{10}$ alkyl group unsubstituted or substituted with halogen, or a $C_6$-$C_{20}$ aryl group unsubstituted or substituted with halogen.

8. The polymer of claim 1, wherein the polymer is represented by one of Formulae 5 to 17:

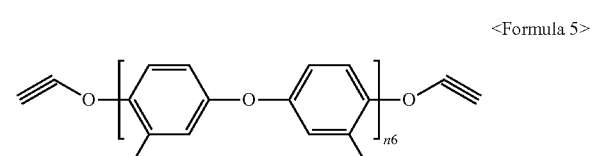
<Formula 5>

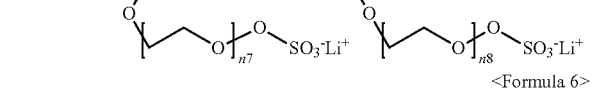
<Formula 6>

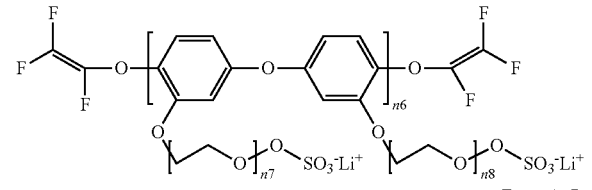
<Formula 7>

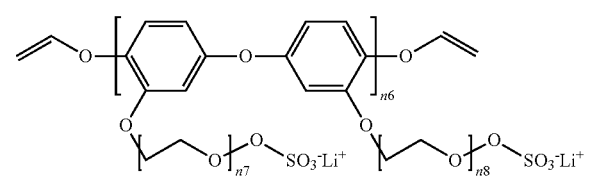

-continued

<Formula 8>
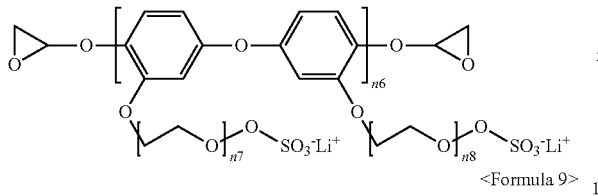

<Formula 9>
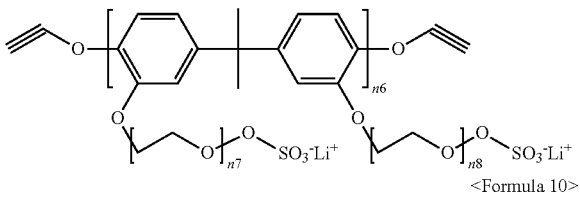

<Formula 10>
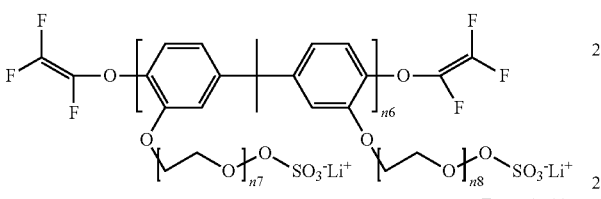

<Formula 11>
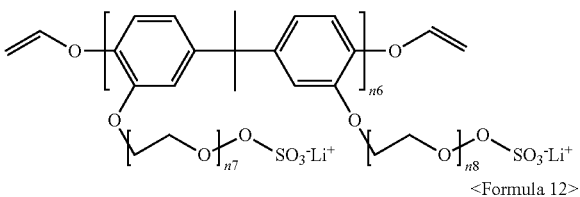

<Formula 12>
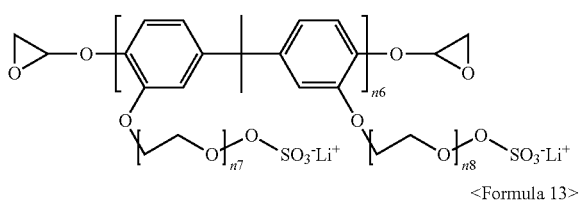

<Formula 13>
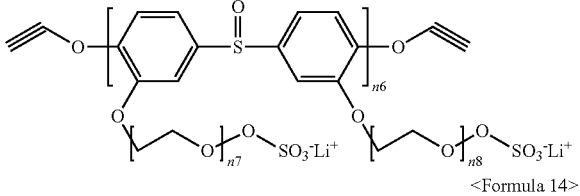

<Formula 14>
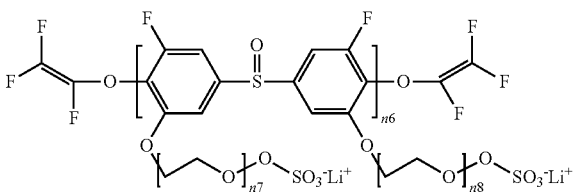

-continued

<Formula 15>
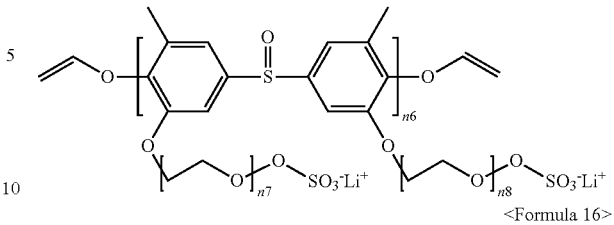

<Formula 16>
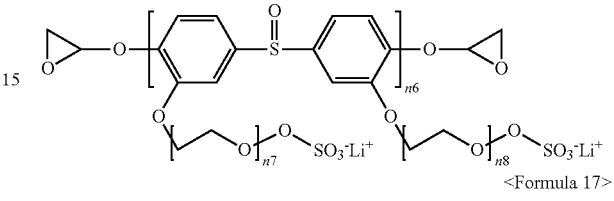

<Formula 17>
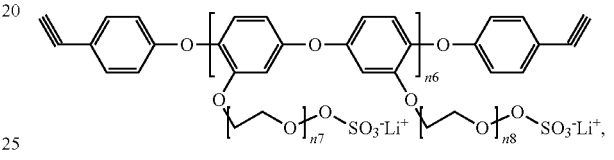

wherein, in the formulae above,
n6 is an integer from 1 to 100, and
n7 and n8 are each independently an integer from 2 to 300.

9. The polymer of claim 1, wherein the polymer has a weight-average molecular weight in a range of 5,000 to 300,000 as measured by gel permeation chromatography (GPC) with respect to a polystyrene reference sample.

10. The polymer of claim 1, wherein the polymer has a glass transition temperature of at least −20° C.

11. An electrolyte comprising:
the polymer of claim 1; and
a lithium salt.

12. The electrolyte of claim 11, wherein the lithium salt comprises at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($2 \le x \le 20$, $2 \le y \le 20$), LiCl, and LiI.

13. The electrolyte of claim 11, wherein the electrolyte has ionic conductivity of at least $7 \times 10^{-7}$ S/cm at a temperature of 20° C.

14. The electrolyte of claim 11, wherein the electrolyte further comprises a product of a crosslinking reaction of the polymer.

15. A lithium battery, comprising:
a cathode;
an anode; and
an electrolyte located between the cathode and the anode,
wherein at least one selected from the cathode, the anode, and the electrolyte comprise at least one of the polymer of claim 1 and a crosslinking product thereof.

* * * * *